United States Patent [19]

Blaurock

[11] Patent Number: 4,743,124
[45] Date of Patent: May 10, 1988

[54] ANTI-FRICTION BEARING

[75] Inventor: Günter Blaurock, Niederwerrn, Fed. Rep. of Germany

[73] Assignee: Deutsche Star GmbH, Schweinfurt, Fed. Rep. of Germany

[21] Appl. No.: 893,195

[22] Filed: Aug. 4, 1986

[30] Foreign Application Priority Data

Aug. 2, 1985 [DE] Fed. Rep. of Germany ....... 3527886
Jun. 19, 1986 [DE] Fed. Rep. of Germany ....... 3620571

[51] Int. Cl.$^4$ ............................................. F16C 29/06
[52] U.S. Cl. .................................................... 384/45
[58] Field of Search ............................ 384/45, 43, 44; 464/168

[56] References Cited

U.S. PATENT DOCUMENTS 4,502,737  3/1985  Osawa ................................. 384/45

FOREIGN PATENT DOCUMENTS

| 0138360 | 4/1984 | European Pat. Off. |
| 0120093 | 10/1984 | European Pat. Off. |
| 0197150 | 5/1985 | European Pat. Off. |
| 1425966 | 4/1969 | Fed. Rep. of Germany |
| 3005579 | 8/1980 | Fed. Rep. of Germany |
| 3227902 | 7/1982 | Fed. Rep. of Germany |
| 3148331 | 11/1982 | Fed. Rep. of Germany |
| 3238980 | 5/1983 | Fed. Rep. of Germany |
| 3303831 | 8/1983 | Fed. Rep. of Germany |
| 3313575 | 10/1983 | Fed. Rep. of Germany |
| 3304895 | 10/1983 | Fed. Rep. of Germany |
| 3304895 | 10/1983 | Fed. Rep. of Germany |
| 3224282 | 12/1983 | Fed. Rep. of Germany |
| 3333754 | 1/1984 | Fed. Rep. of Germany |
| 3400849 | 8/1984 | Fed. Rep. of Germany |
| 3324840 | 10/1984 | Fed. Rep. of Germany |
| 3313129 | 10/1984 | Fed. Rep. of Germany |
| 2523669 | 3/1983 | France |

OTHER PUBLICATIONS

Patent Abstracts of Japan, Ser. M-434, Nov. 30, 1985, No. 303—Roller Type Bearing for Linear Motion.
Catalog NR. 41-2G, "THK Bearings" of THK Co., Ltd. (no date).

Primary Examiner—Lenard A. Footland
Attorney, Agent, or Firm—Toren, McGeady & Associates

[57] ABSTRACT

An anti-friction bearing is provided in which two cage halves have end plates inserted in the bearing main body. The end plates have bearing member deflection surfaces. Retaining webs originating from the end plates abut one another in a plane normal to the axis. The bearing members (e.g. balls or rollers) are deflected on deflection surfaces inside the end plates. The retaining webs are designed in such a way that, in each case, two retaining webs in alignment with one another and originating from end plates located opposite one another are sufficient to hold the load-transmitting bearing member rows of two bearing member circuits in engagement with the respective bearing member tracks of the bearing main body.

55 Claims, 11 Drawing Sheets

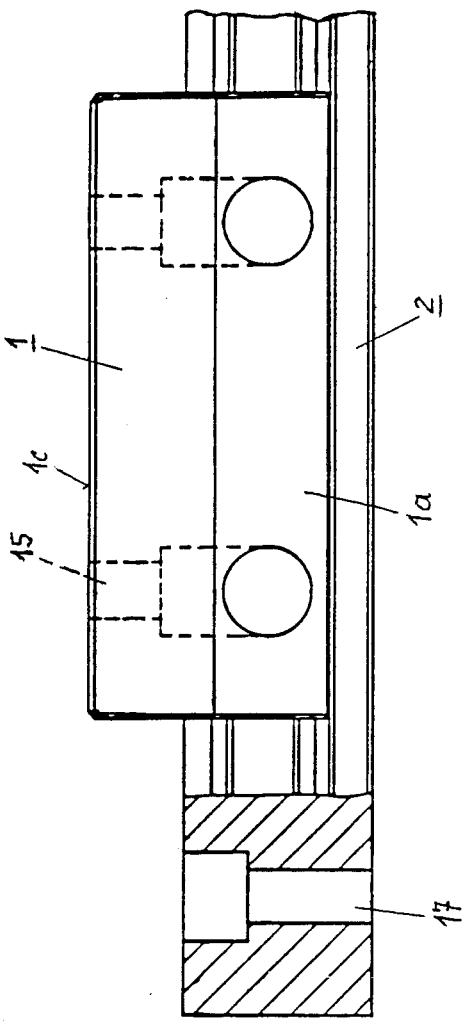

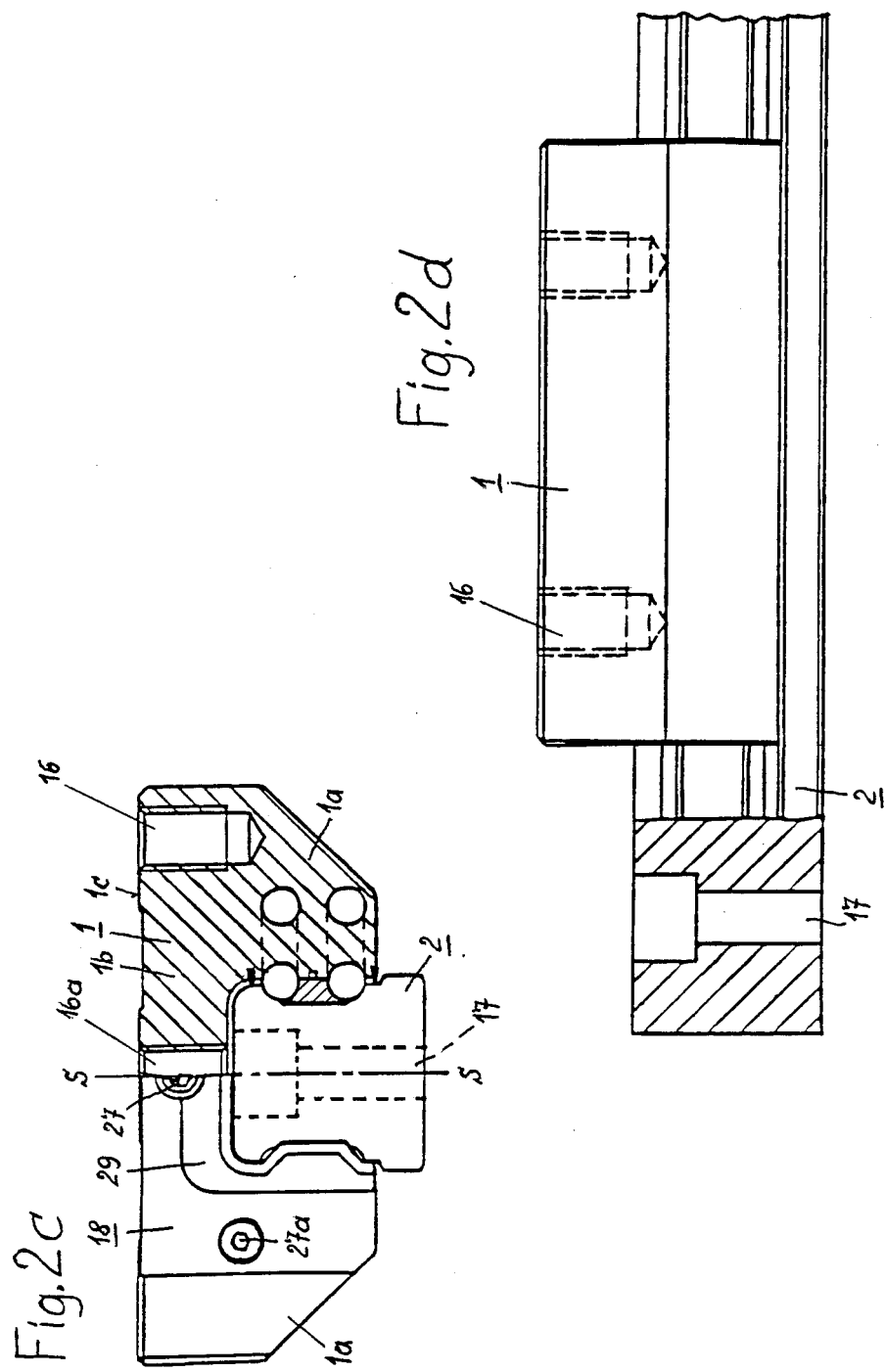

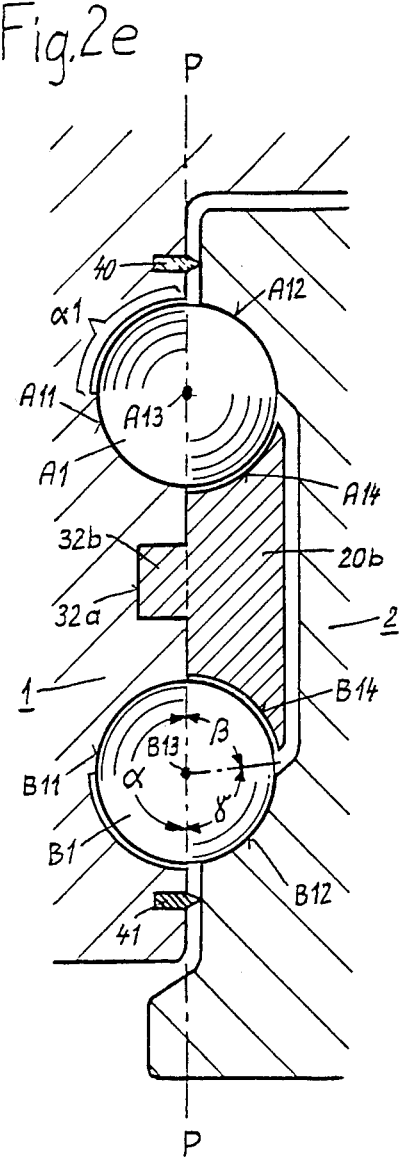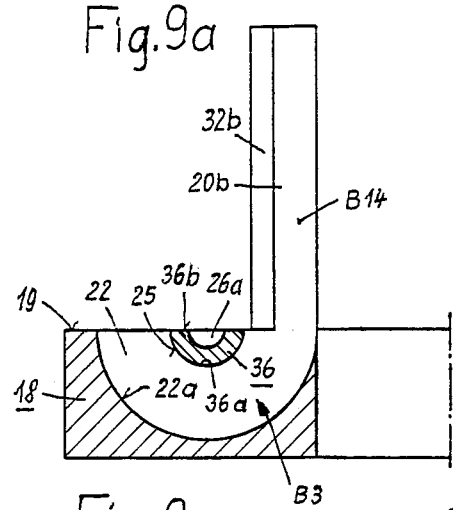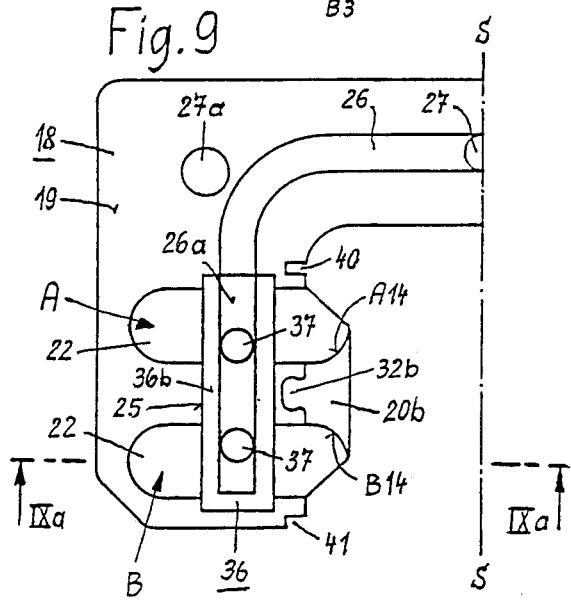

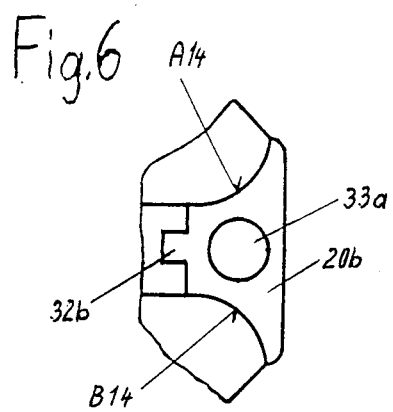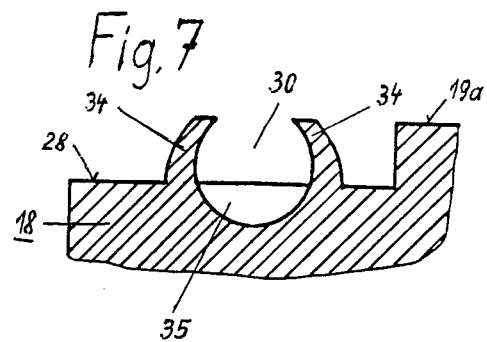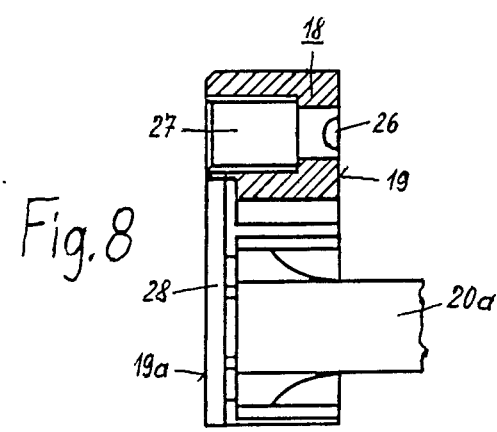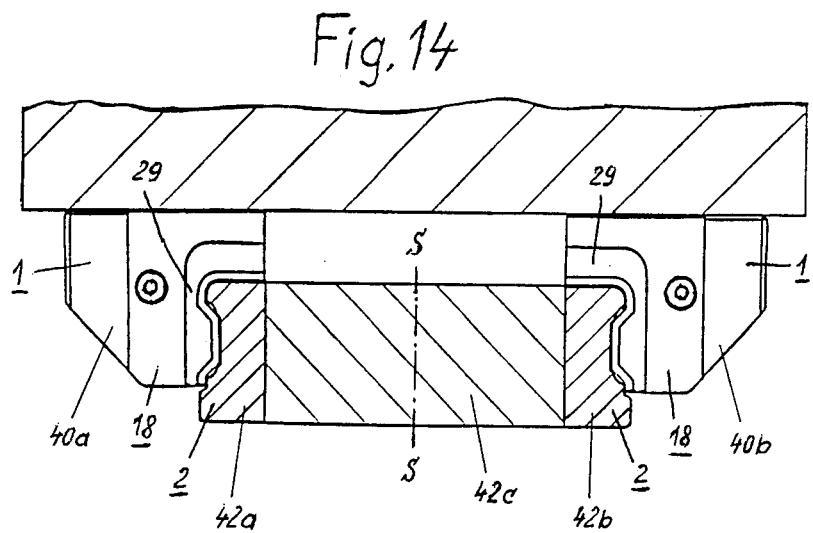

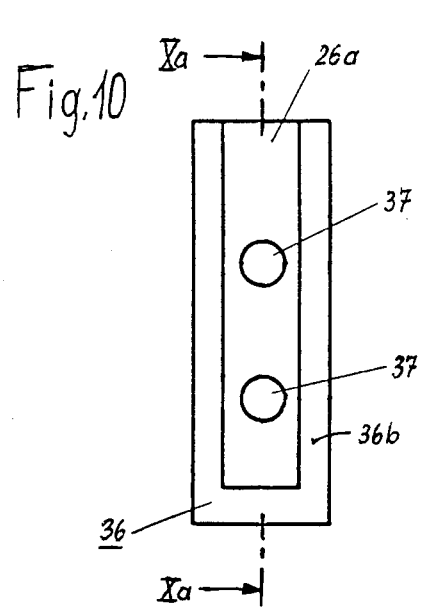
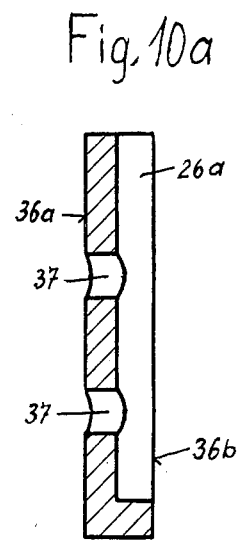
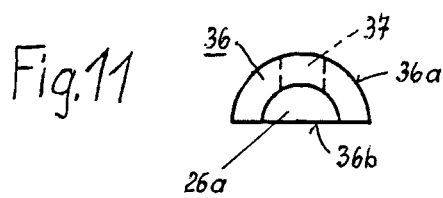
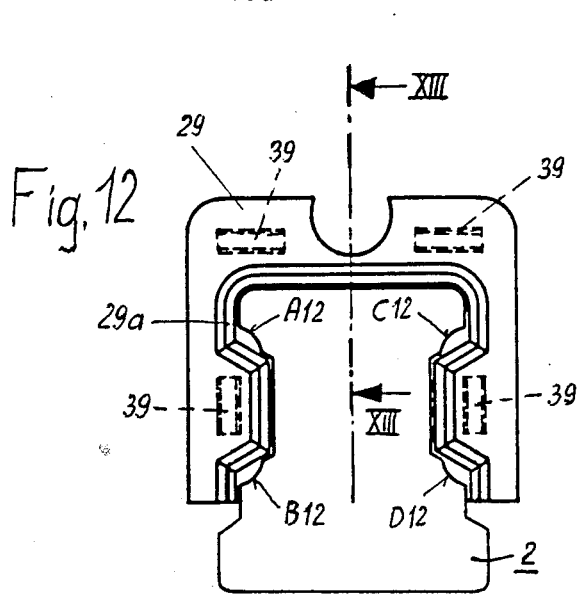
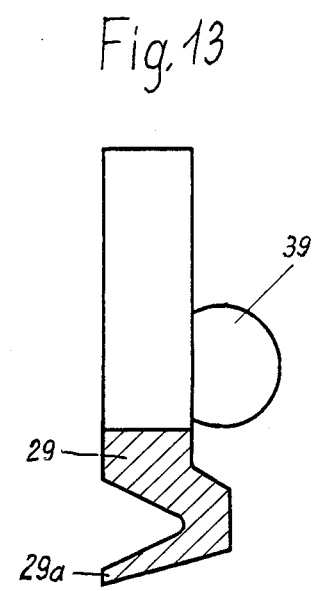

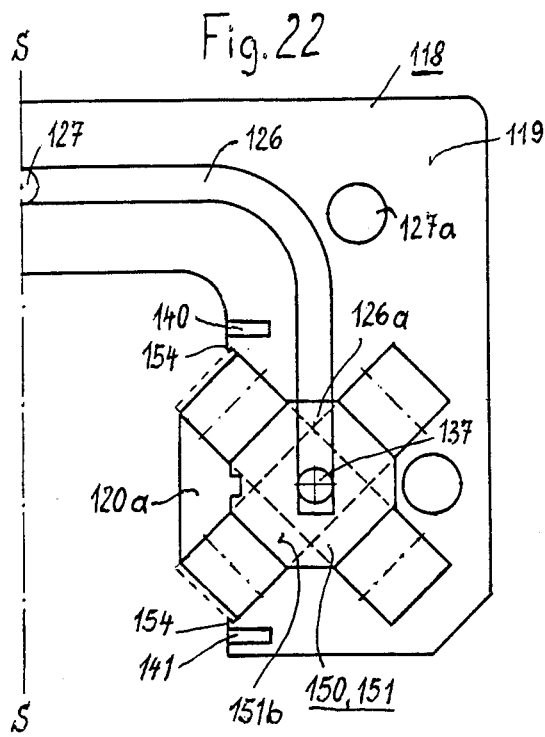
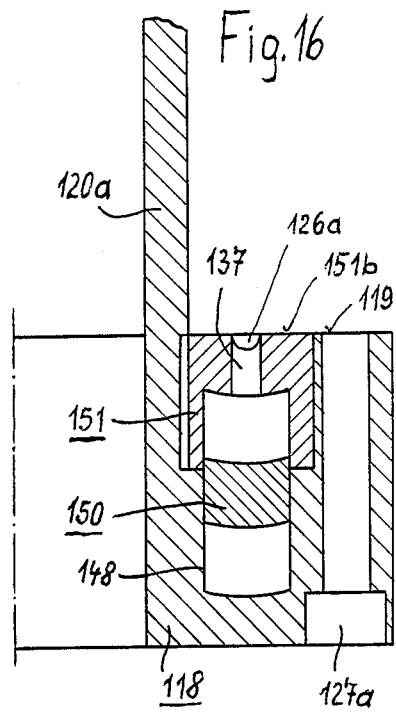
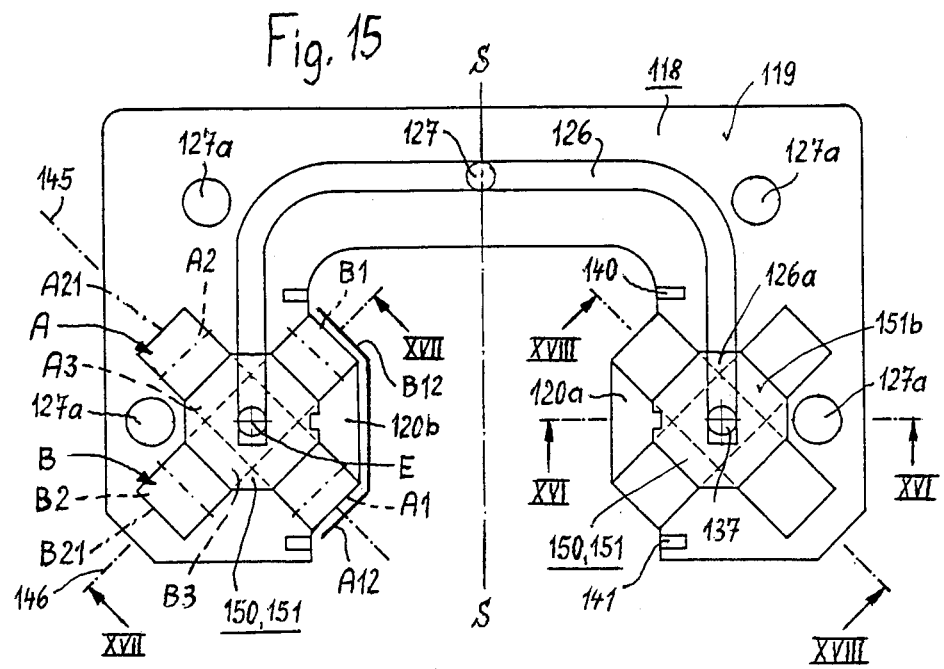

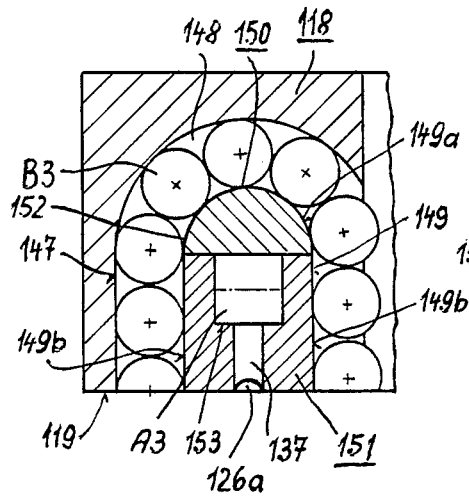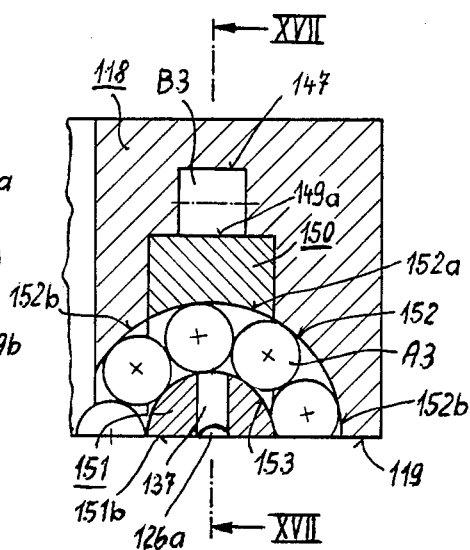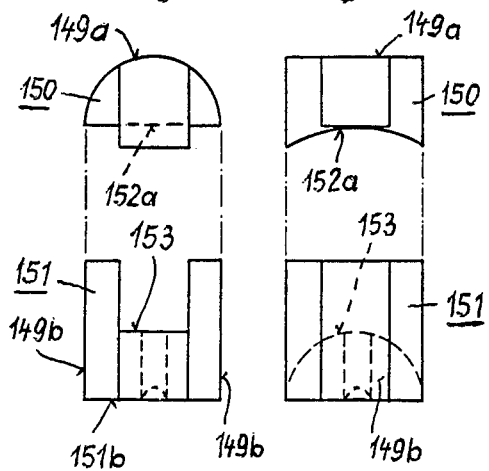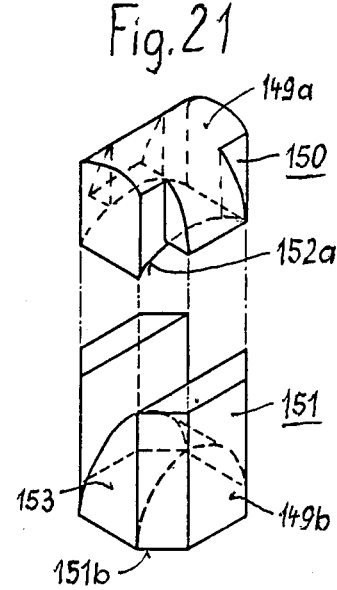

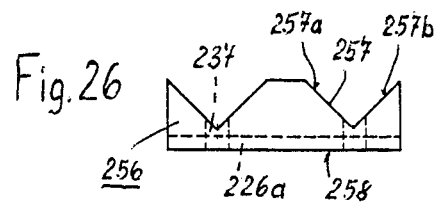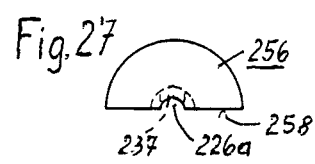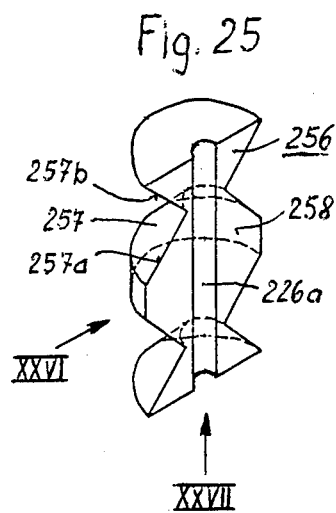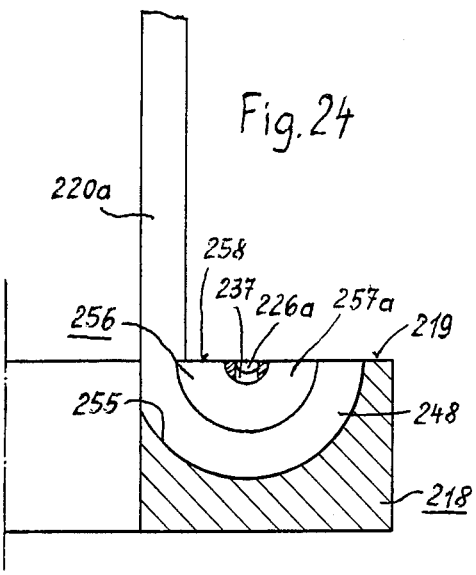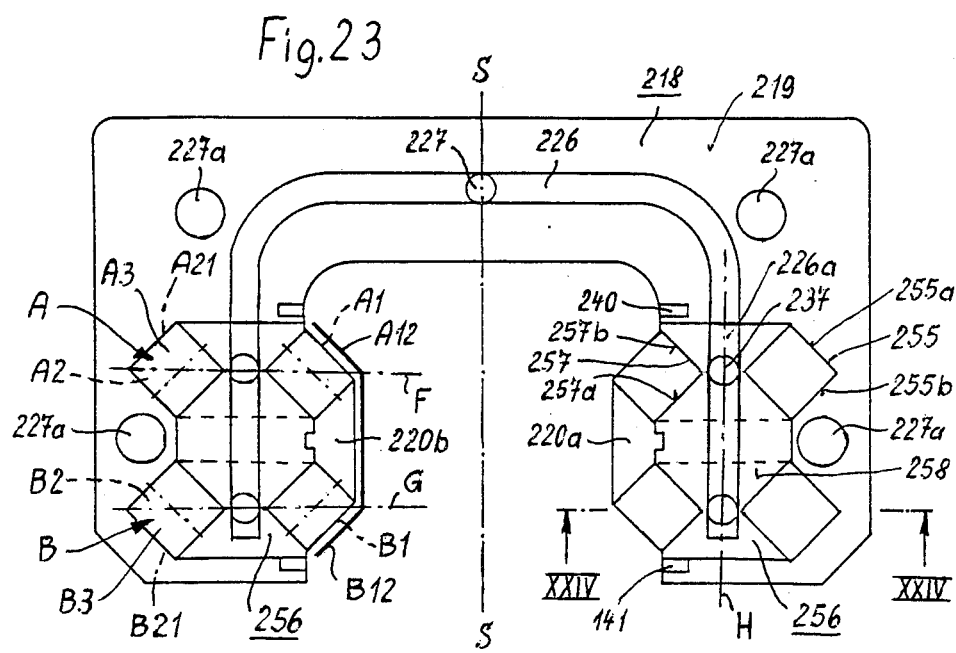

ANTI-FRICTION BEARING

FIELD OF THE INVENTION

The invention relates to an anti-friction bearing.

BACKGROUND OF THE INVENTION

An anti-friction bearing is known comprising a bearing main body which is mounted for axial movement on a rail and has two end faces which are spaced in the axial direction of the rail and are substantially normal to the axis. The bearing main body has at least one pair of bearing member circuits, each one of which has a rectilinear, load-transmitting bearing member row in engagement with an axially parallel, load-absorbing track of the bearing main body. Each load-transmitting bearing member row is also in engagement with an axially parallel, load-absorbing track of the rail. Each bearing member circuit has a bearing member row running in the reverse direction and there are two curved bearing member rows between the latter and the respective load-transmitting bearing member row. The bearing member rows which run in the reverse direction are guided in the bearing main body by return channels approximately parallel to the axis. End plates are attached to the said end faces of the bearing main body, the end plates having deflection surfaces for curved bearing member rows. The end plates are made with axially parallel retaining webs which are located in alignment with one another and abut at their ends. The retaining webs secure the load-transmitting bearing member rows in engagement with the load-absorbing tracks of the bearing main body.

The known anti-friction bearings have cages (end plates and half webs) of plastics material. In the German Offenlegunggschrift No. 3,227,902 and in the German Offenlegungsschrift No. 3,148,331, there is described a bearing whose plastics cage is divided in two perpendicular to the axial plane. Each portion of the cage comprises an end plate having incorporated ball return recesses and five integrally molded retaining webs. The disadvantage of this construction, however, is the high number of retaining webs for the guidance of the four loaded ball rows since this construction requires a complicated and therefore uneconomical injection molding die and uses a great deal of material. In addition, larger radii or bevels are made on the bearing main body for the ball deflection at the exit or entry into the loaded ball raceways, which requires considerable re-machining. If this is not done, then shock-like loading and load relieving of the load-carrying balls results, together with an enormous edge pressure at the transition to the end plate. Therefore the cycle is impaired and the life of the bearing is considerably reduced. Moreover, despite the said radii, the cycle is not satisfactory in the embodiment according to the German Offenlegunggschrift No. 3,227,902, because the inner and outer deflection radii do not form concentric semi-circles, which leads to unsteadiness and varying ball play during deflection.

This shortcoming is largely removed in the construction disclosed in German Offenlegungsschrift No. 3,148,333. Here, however, the problem remains of continuing the outer radius in the bearing main body at the transition to the return bore. From the production point of view, this can only be done with great difficulty, if at all. To enable the linear bearing to be lubricated, remachining is likewise necessary by drilling a lubricating hole and several connecting channels in the bearing main body (German Offenlegungsschrift No. 3,227,902). This causes additional costs and increased time spent in the manufacture of the bearing element. Sealing is not provided. Consequently, the lubricant can escape very easily and dirt can penetrate into the bearing element, so that the life is reduced.

In another linear bearing disclosed in German Offenlegunggschrift No. 3,224,282, three additional strips to be screwed on in the bearing main body are added to four integrally molded cage retaining webs for two ball rows, which results in a further complication of the bearing unit. Furthermore, this construction suffers from the same disadvantages as those of German Offenlegungsschrift No. 3,227,902.

A ball sliding bearing having two plastics cage halves is known from the German Offenlegungsschrift No. 3,303,831. The construction disclosed in the latter, however, involves remachining the bearing main body and also involves the use of a complicated injection molding die so that the construction can produce the necessary deflection. Moreover, no subsequent lubrication and sealing is possible. In addition, the loading capacity of this bearing is limited, because the shaft cannot be continuously supported. Furthermore, the basis of this embodiment is not a bearing block which can be screwed directly over a flat contact surface, but a sleeve-like element which is located by a housing bore.

A cage for an open rail guide having two ball rows is described in French Patent Specification No. 2,523,669. The device can be made from metal or plastics and has features such as the cages described above. According to FIGS. 4 and 5 of French Patent Specification No. 2,523,669, the end plate and the ball guide for the two raceways of the two cage halves are in one piece. The balls are deflected in the end plate. Remachining is necessary to achieve a good transition and therefore a low wear and smooth cycle at the ball inlet and outlet. Nevertheless, it is not possible as above described in connection with the constructions of German Offenlegungsschrift No. 3,227,902 and German Offenlegungsschrift No. 3,148,333, to achieve any satisfactory cycle. Additionally, the manufacture of the end area "outer deflection radius", in conjunction with the return bore, produces considerable problems. Means of subsequent lubrication and seals are also lacking in this case.

However, bearing elements for longitudinal guides are also known in which considerable remachining of the loaded raceway ends of the bearing main body is no longer necessary and nevertheless a good ball transition and smooth ball running is achieved. In the constructions disclosed in German Offenlegungsschriften Nos. 3,005,579, 1,425,966, 3,313,129, 3,304,895 and 3,313,575, this is achieved by semi-cylindrical deflection pieces, the radius of which corresponds to half the ball diameter. The deflection pieces are inserted in recesses between the end plate and the end face of the bearing main body and therefore guide the balls from inside. The outer ball guidance is assumed by the known U-shaped recesses in the side plate. All these constructions have one common factor: the end plate, which provides for the ball deflection, and the retaining webs are made and assembled separately. Thus the number of parts is increased and therefore the production and assembly effort, as well as the number of joint transitions and sources of defects, are likewise increased.

The object of the invention is to provide an anti-friction bearing which can be easily manufactured especially in relation to the manufacture of the bearing main body, end plates and the retaining webs.

SUMMARY OF THE INVENTION

According to the present invention, there is provided an anti-friction bearing comprising a rail: a bearing main body which is mounted on and adapted to be moved axially along the rail; at least one pair of bearing member circuits which are formed in the bearing main body and in the rail, each bearing member circuit of the pair having a rectilinear, load-transmitting bearing member row in engagement with an axially parallel, load-absorbing track of the bearing main body and with an axially parallel, load-absorbing track of the rail, a bearing member row running in the reverse direction and two curved bearing member rows therebetween; end plates having deflection surfaces for the curved bearing member rows and the end plates being made with axially parallel retaining webs which are located in alignment with one another and which abut at their ends, the retaining webs securing the load-transmitting bearing member rows in engagement with the load-absorbing tracks of the bearing main body; the two load-transmitting bearing member rows of the two bearing member circuits of the pair being secured in engagement with the respective track of the bearing main body by a single group of two retaining webs which are in alignment with one another and which are common to the load-transmitting bearing member rows, each retaining web being provided on a portion of an end plate and being arranged between the load-transmitting bearing member rows.

In the construction according to the invention, the cage parts, which consist in each case of an end plate and a retaining web for, in each case, two bearing member circuits, can be manufactured in particular from plastics in the simplest manner either by pouring or injecting, with machining either being completely avoided or reduced to a minimum.

To give the bearing members a good hold on the bearing main body even before the latter is assembled with the rail, it is proposed that the retaining webs have retaining grooves for the load-transmitting bearing member rows.

To fix the retaining webs in their position clearly and non-displaceably with respect to the bearing main body, it is proposed that the retaining webs be supported on the bearing main body by a tongue-and-groove connection or a similar connection, in particular having a dovetail section.

To connect the retaining webs to one another at the abutment locations, which retaining webs belong to end plates located opposite one another, and to ensure the exact profile alignment of the retaining webs, it is proposed that the ends facing toward one another of retaining webs in alignment with one another are connected to one another by push-in connections or the like.

To manage with only rectilinear tracks and return channels in the bearing main body, which tracks and return channels can be easily manufactured, it is proposed that end faces of the bearing main body are arranged at the transition point from the rectilinear, load-transmitting bearing member rows to the curved bearing member rows, and that a curved bearing member row be guided by an outer deflection surface, i.e. one further from the bearing main body, mounted in a contact surface of the end plate and by an inner deflection surface, i.e. on nearer the bearing main body, the inner deflection surface being formed on at least one deflection piece which is received in a deflection piece holder in the contact surface of the end plate.

Optimum smooth running of the bearing member circuits results when the curved bearing member rows follow a semi-circle. This means that the outer and inner deflection surfaces too must then have a concentrically circular course.

When the bearing member circuits of a pair are parallel, a simple and cost-effective production can be achieved when the adjacently located curved bearing member rows of the bearing member circuits of the pair are allocated a common deflection piece which is received by a common deflection-piece holder.

A reliable lubrication of the anti-friction bearing, which nevertheless requires very minor additional measures during manufacture, can be obtained by providing a lubricant supply channel in the contact surface of at least one end plate. The lubricant supply channel may be connected to a lubricant inlet of the end plate, may lead to the deflection-piece holder and may supply one or two bearing member circuits with lubricant by a lubricant distribution system within each deflection-piece holder. All the bearing member circuits are preferably supplied with lubricant from one lubricant supply channel. If it is assumed that the end plate is produced by pouring or injecting plastics material, the lubricant supply channel can be manufactured during the pouring or injecting operation without requiring any special machining. At the same time, the lubricant distribution system can be formed within the deflection-piece holder by a longitudinal distribution channel in a rear surface of the deflection piece, the rear surface facing away from the inner deflection surface. The lubricant distribution system may also comprise a transverse bore which connects the longitudinal distribution channel with the inner deflection surface of the respective curved bearing member row. Thus the lubricant distribution system is disposed in the deflection piece, which can be made independently of the end plate by injection molding without further machining.

It is recommended that the lubricant inlet be fastened to a front face of the end plate which is parallel to the contact surface of the end plate, and that this be done in such a way that a lubricating device arranged adjacent the lubricant inlet exerts pressure on the end plate perpendicular to the contact surface. This has the advantage that the contact pressure of the device causes the end plate to press against the bearing main body and no lubricant is able to escape between the end plate and the bearing main body.

The anti-friction bearing according to the present invention may have a bearing main body which comprises two oppositely disposed pairs of bearing member circuits which receive the rail between them. This may be used in association with a rail of approximately rectangular cross-section, with recesses being arranged in the two side faces located opposite one another, to the edges of which recesses the tracks of the rail are attached. The retaining webs are disposed in the space between these tracks.

If a simple production method is required, the bearing member circuits may be arranged in the U-legs of the bearing main body parallel to the U-web of the bearing main body.

Apart from the regular, one-piece configuration of the bearing main body, it is also possible for the oppositely located pairs of bearing member circuits to be accommodated in parts of the bearing main body, the mutual spacing of these parts being variable. In this way, parts of bearing main bodies can be manufactured as standard parts which can be arranged at various distances for various rail widths, the parts being either connected to one another by appropriate connecting pieces or being directly attached individually to the machine part to be guided in each case.

The running rail can also be made up of two profiled parts having load-absorbing tracks and at least one intermediate piece. This results in the possibility of making up tracks of different widths from standard parts which can be manufactured correspondingly inexpensively in large quantities.

To prevent the entry of dirt, for example metal chips, into the area of the bearing member circuits when the bearing is used for guiding a slide on a machine tool, sealing plates may be attached to the end plates on their front faces facing away from the bearing main body. The sealing plates may have a sealing edge which at least approximately follows the profile of the rail at least on a portion of its periphery. At the same time, the sealing edge may of course be formed in such a way that it can adapt as tightly as possible to the profiled periphery of the rail. So as to protect the sealing plate on the one hand and so as not to impair the pleasing appearance of the bearing main body and the end plates on the other hand, the sealing plates can be located in recesses of the end faces and substantially flush with the latter. This also results in a reduction in the structural length in comparison with that of known bearings having attached sealing plates.

In order to achieve simple assembly, the sealing plates can be fixed on the end plates by snap connections. At the same time, the snap connections can be designed like push buttons and formed, for example, by interlocking C-sections and bulbous sections.

To perfect the sealing of the bearing member circulation channels even further, in particular with regard to any dirt penetration through fixing openings of the rail, sealing strips which are parallel to the load-transmitting bearing member rows can be attached to the bearing main body, and if necessary also to the end plates, on both sides of the load-transmitting bearing member rows of a pair of bearing member circuits, the sealing strips being slidably mounted against the rail.

If the bearing main body is made U-shaped in cross-section and there is a loading situation in which the web of the U cross-section attempts to lift from the rail, this loading situation will produce a spreading effect on the U-legs. The stability of the U cross-section against such a spreading effect can be improved by arranging that the U-web of the bearing main body has a contact surface, remote from the rail, for contact on a machining part, and that the U-web is connected to the machine part by bolted connections, or the like, which are arranged close to the U-legs and also, if desired, approximately centrally between the U-legs. An embodiment of the invention described below is particularly suitable for such an arrangement of bolted connections between the U-legs, because cage parts are lacking in the area of the U-web.

As will be appreciated, the present invention may therefore have a bearing main body which is simple to produce and a plastics cage which makes possible smooth bearing member deflection with a smooth cycle and low wear. At the same time, the bearing may have means for distributing lubricant and locating the bearing seal. The entire bearing element can be constructed from only a few parts, which can be manufactured economically, without further machining being necessary on the bearing main body for the ball deflection.

In the first embodiment of the present invention, the bearing member circuits can be ball circuits.

In this case the construction is preferably such that, on one side of a plane containing the axes of the two load-transmitting ball rows of the pair, the load-transmitting ball rows of the pair of ball circuits adjoin the tracks of the bearing main body. On the other side of this plane, their peripheral areas which face each other adjoin the retaining webs and their peripheral areas remote from each other adjoin the tracks of the rail.

For reasons of simplicity of manufacture, it is also preferable that adjacent curved ball rows of the ball circuits of the pair are provided with a common, semi-cylindrical deflection piece, which is received by a common, semi-cylindrical deflection piece receiving channel.

It is advantageous, for quiet running, if the outer deflection surface and the inner deflection surface form a deflection channel of approximately constant cross section.

In order to achieve a further increase in the load-bearing coefficient and the torque loading, it may also be appropriate for the bearing member circuits to be roller circuits, for the load-transmitting bearing member rows to be load-transmitting roller rows, for bearing member rows running in the reverse direction to be roller rows running in the reverse direction, and for the curved bearing member rows to be curved roller rows.

The design of the anti-friction bearing with rollers is as a rule more complicated than with balls, especially if, when seen in a section perpendicular to the rail axis, there is only a limited amount of space for accommodating the roller circuits.

A first possibility for nevertheless accommodating roller circuits in a tight space consists in arranging paired roller circuits in intersecting planes, the lines of intersection of these planes lying parallel to the rail axis. It may also be arranged that the curved roller rows of the paired roller circuits, which rows have one and the same end plate, are spaced out so as to intersect in the axial direction of the rail. Moreover, in the load-carrying roller row rollers, the rollers of the roller rows running in the reverse direction and the curved roller row rollers may be arranged axially parallel to each other in each of the roller circuits.

In order to make it possible in such an embodiment to manufacture the deflection surfaces according to the usual technical methods, it is proposed that the deflection surfaces of the intersecting curved roller rows be formed on the respective end plate and on deflection pieces mounted in this end plate. These deflection pieces may comprise an outer deflection piece, i.e. one further from the bearing main body, and an inner deflection piece, i.e. one nearer the bearing main body.

In detail, an embodiment which has shown itself to be particularly advantageous is characterised in that, of two intersecting curved roller rows, the outer curved roller row, i.e. the one further from the bearing main body, comprises an outer deflection surface formed on a countersunk portion in the end plate and an inner deflection surface formed by the outer deflection piece and the inner deflection piece. Moreover, the inner curved roller row, i.e. the one nearer the bearing main body, may comprise an outer deflection surface, which is formed partly from the outer deflection piece and partly from the countersunk portion of the end plate, and an inner deflection surface, which is formed by the inner deflection piece.

Even with this embodiment lubricant can be supplied via the deflection pieces.

Since it is desirable that the two end plates and possibly the corresponding retaining webs are identical in shape, it is recommended that the paired roller circuits have approximately the same length in the axial direction of the rail, one of the roller circuits forming the inner curved roller row in the region of one of the end plates and the outer curved roller row in the region of the other end plate.

A further embodiment employing rollers is constructed as follows. Two paired roller circuits are arranged in substantially parallel planes or in planes which intersect at an acute angle beyond the roller circuits and have lines of intersection parallel to the axial direction of the rail. In each roller circuit, the load-transmitting roller row rollers on the one hand and the rollers of the roller row running in the reverse direction on the other hand are arranged with their roller axes in common planes inclined towards each other, and the rollers of the curved roller row are arranged with their axes on a tapered surface.

In the case of the last-mentioned embodiment, a design may be selected in which a curved roller row comprises an outer deflection surface, i.e. one further from the bearing main body, which surface is formed by a countersunk portion of the respective end plate and consists of two outer partial deflection surfaces, namely a first conical partial deflection surface adjacent the circumferential surfaces of the rollers and a second outer conical partial deflection surface adjacent an end face of the rollers of the curved roller row. Each curved roller row also comprises an inner deflection surface, i.e. one nearer the bearing main body, which surface is formed on a deflection piece mounted in the respective end plate and consists of two inner partial deflection surfaces, namely a first inner conical partial deflection surface adjacent the circumferential surfaces of the curved roller row rollers and a second inner conical partial deflection surface adjacent the other end faces of the curved roller row rollers. In this embodiment also lubricant can be supplied via the deflection piece holder or the deflection piece itself.

For reasons of manufacturing simplicity it is recommended that the two paired roller circuits be provided with a common deflection piece.

The rollers can be constructed as cylindrical rollers, barrel-type rollers or cylindrical needles.

In both the roller bearing embodiments mentioned above it is possible for the rollers to run separately, so that it is unnecessary to connect the rollers together by a chain or belt, as is known for example from European Patent No. 138,360. The possibility of connecting the rollers together by such a chain or belt is not ruled out, however.

Particularly in the roller embodiment described last, in which the rollers run over conical deflection surfaces and spaces are provided in the region of the curved roller rows between the rollers at each end of the rollers, it could also be advantageous to provide individual spacers between the rollers.

BRIEF DESCRIPTION OF THE DRAWINGS

The invention is illustrated, merely by way of example, in the accompanying drawings, FIG. 2a shows an end view in half section of a rail guide with installed retaining webs which forms part of the bearing of FIG. 1, FIG. 2b shows a side view of the said rail guide, FIG. 2c shows an end view similar to FIG. 2a but illustrating another embodiment, FIG. 2d shows a side view similar to FIG. 2b but illustrating the said other embodiment, FIG. 2e is an enlarged sectional view showing load-transmitting ball rows of the bearing, FIG. 6 is an enlarged view of a retaining web shown at VI in FIG. 3, FIG. 7 is an enlarged view of a snap connection shown at VII in FIG. 4, FIG. 8 is a section taken on the line VIII—VIII of FIG. 3, FIG. 9 shows a deflection piece in an installed condition, FIG. 9a is a section taken on the line IXa—IXa of FIG. 9, FIG. 10 shows a side view of a flat side of a semi-cylindrical deflection piece, FIG. 10a is a section taken on the line Xa—Xa of FIG. 10, FIG. 11 is a plan view of the deflection piece shown in FIG. 10, FIG. 12 is an outside view of a sealing plate, FIG. 13 is a section taken on the line XIII—XIII of FIG. 12, FIG. 14 shows a further embodiment of a bearing according to the present invention, FIG. 15 is a view of a contact surface of an end plate forming part of an embodiment of the bearing of the present invention having intersecting roller circulation channels, FIG. 16 shows a section taken on the line XVI—XVI of FIG. 15, FIG. 17 shows a section taken on the line XVII—XVII of FIG. 15, FIG. 18 shows a section taken on the line XVIII—XVIII of FIG. 15, FIG. 19 is an exploded view of inner and outer deflection pieces forming part of the embodiment of FIGS. 15 to 18, FIG. 20 is an exploded view of the said inner and outer deflection pieces when turned round through 90°, FIG. 21 is a perspective exploded view of the structure shown in FIGS. 19 and 20, FIG. 22 shows a modification of the structure of FIG. 15 in which securing members are provided for the rollers, FIG. 23 is a view, corresponding to FIG. 15, of the contact surface of an end plate in another embodiment of a bearing according to the present invention, FIG. 24 shows a section taken on the line XXIV—XXIV of FIG. 23, FIG. 25 is a perspective view of a deflection piece forming part of the embodiment of FIG. 23, FIG. 26 is a view of the deflection piece according to FIG. 25 looking in the direction of arrow XXVI of FIG. 25, FIG. 27 is a view looking in the direction of arrow XXVII of FIG. 25.

BRIEF DESCRIPTION OF THE PREFERRED EMBODIMENTS

Figure 1:
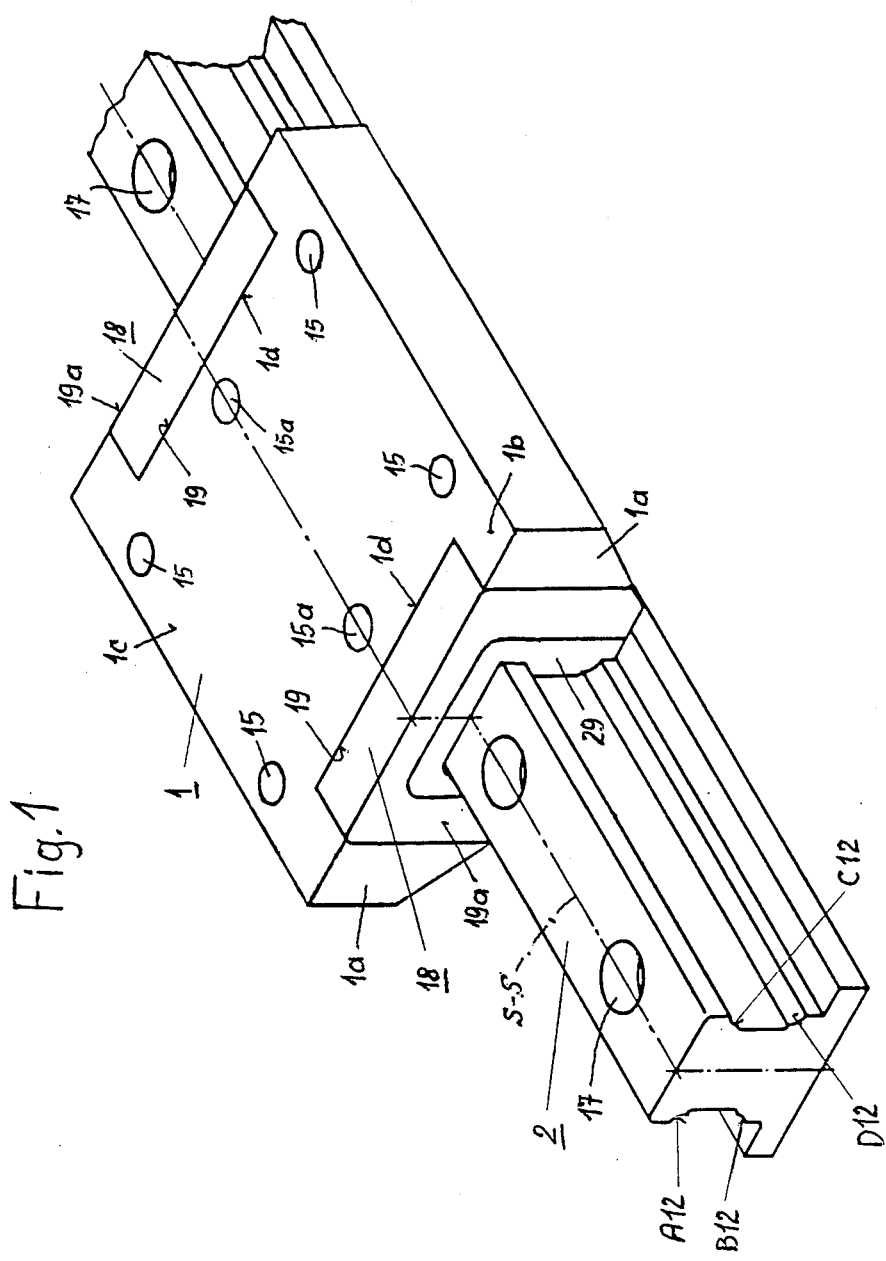
FIG. 1 shows an overall perspective view of an antifriction bearing according to the present invention.

In FIGS. 1, 2a and 2b there is shown an anti-friction bearing according to the present invention. A bearing main body 1 is mounted on and adapted to be moved axially along a rail 2. The bearing main body 1 has four ball circulation channels or circuits A, B, C and D (FIG. 2a) and is thus provided with axially running, load-carrying ball rows A1, B1 . . . , which are associated with four load-absorbing tracks A12, B12, C12 and D12 (FIG. 1) incorporated in the rail 2. This enables parts which can be displaced relative to one another to be moved longitudinally even when the bearing main body 1 or the rail 2 is acted upon simultaneously by a torque. Ball rows A2 and B2 (FIG. 2a) run in the reverse direction and are guided inside the bearing main body 1 in return bores A21, B21 . . . , so that four ball circulation channels A, B, C and D are provided which comprise curved ball rows A3, B3, etc., connecting the load-transmitting ball rows A1, B1, etc, and the ball rows A2, B2, etc., running in the reverse direction. Two ball circulation channels A, B; C, D each lie on a plane which lies perpendicular to a plane S—S of symmetry (FIG. 2a of the bearing).

The bearing main body 1 is fixed together by bolted connections having through bores 15 which, with respect to the plane S—S of symmetry, are located in the outer area of the bearing main body 1 and in its plane S—S of symmetry, namely at 15a. In another embodiment (FIGS. 2c and 2d), threaded bores 16 and 16a can also be provided instead of the through bores 15a. As a result of the additional central means of fixing together of the bearing main body 1, its deformation under lateral and lifting load is prevented and therefore the rigidity of the bearing unit is increased. The rail 2 is bolted to a foundation (not shown) via central bores 17.

Figure 3:
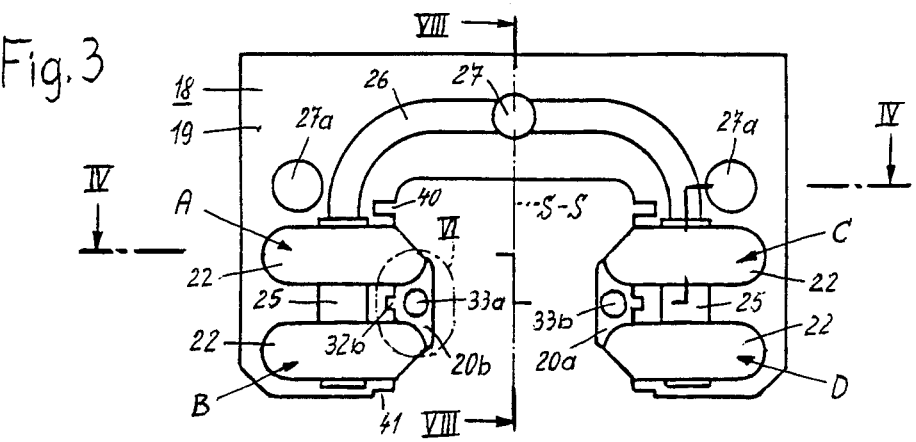
FIG. 3 shows a view of end plates of the bearing, seen from the inside.
Figure 4:
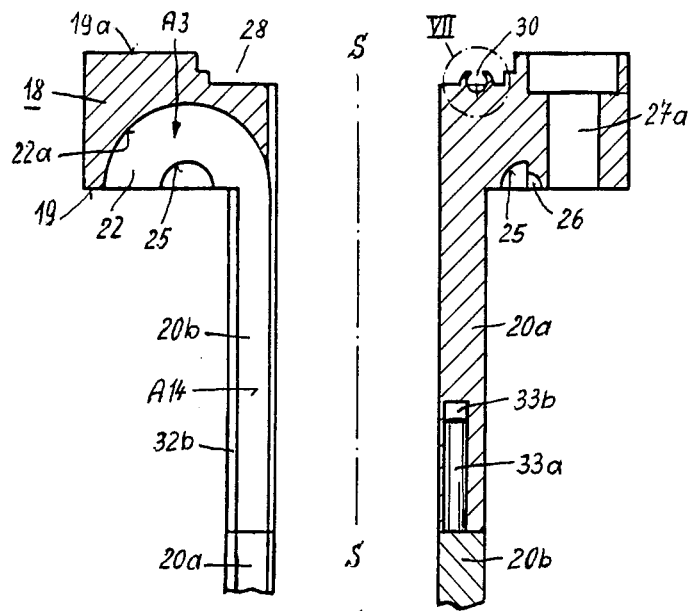
FIG. 4 shows a section on the line IV—IV of FIG. 3.

FIGS. 3 and 4 show an inside view and a section of a half of a plastics cage divided in two in a plane normal to the axis. Each said half consists of an end plate 18 having a contact surface 19 (FIG. 1) and two axially extending retaining webs 20a and 20b which are made integrally with the end plate 18. The webs 20a, 20b are provided to guide the load-transmitting ball rows A1, B1 . . . in the bearing main body 1 during the motion cycle. That is to say, the purpose of the webs 20a, 20b is to hold the said ball rows by means of retaining grooves A14, B14 . . . on the tracks A11, B11 of the bearing main body 1 and in fact even before the assembly of the bearing main body 1 with the rail 2, during which the load-transmitting ball rows then come into engagement with the load-absorbing tracks A12, B12 . . . of the rail 2.

Reference is made in this respect to FIG. 2e, where the peripheral areas of the load-transmitting ball rows A1, B1 . . . , which peripheral areas engage the tracks and retaining grooves A11, B11 . . . ; A12, B12, . . . ; A14, B14 . . . , are designated as $\alpha$, $\gamma$ and $\beta$ respectively. The sum $\alpha + \beta$ of the angles is greater than 180°. This ensures that the balls are also securely held in the bearing main body 1 outside the rail 2. To prevent "boring friction", contact of the balls with the bearing main body is prevented in the area $\alpha 1$ by a slight recess. Friction of the balls on the retaining webs 20a, 20b is prevented after assembly with the rail by appropriate play in the area $\beta$. Four U-shaped recesses 22 in the end plate 18 form outer deflection surfaces 22a for the curved ball rows A3, B3 . . . . The end plate 18 is accommodated inside a recess which forms an end face 1d (FIG. 1) of the bearing main body 1. Furthermore, semi-cylindrical deflection-piece locating channels 25 (FIG. 3) are present in the end plate 18. Corresponding semi-cylindrical deflection pieces 36 (FIGS. 9 and 9a) are placed in the deflection-piece locating channels 25 during assembly. A lubricant supply channel 26 (FIG. 3) having a semi-cylindrical cross-section extends in continuation of the deflection-piece locating channels 25 up to the axis S—S of symmetry of the end plate 18, where a lubricating bore or connection 27 having a threaded connection ensures that the four ball circulation channels A, B, C and D are supplied with lubricant. The plastics cage halves 18, 20a and 20b are fixed on the bearing main body 1 of the bearing element via two bores 27a in the end plate 18 of the cage. A recess 28 (FIG. 5) enables a sealing plate 29 (FIGS. 2a and 2c) to be incorporated. The sealing plate 29 is anchored via a plurality of snap connections 30 and 39 (FIGS. 4, 7, 12, 13).

The sealing plate 29 which is incorporated in the plastics cage, by virtue of its sealing edge 29a (FIG. 12) which follows the profile of the rail 2, at least prevents the penetration of dirt. Additionally inserted sealing strips 40 and 41 (FIG. 2a), which are attached to the bearing main body 1 directly above (40) or below (41) the load-transmitting ball rows A1 and B1 and to the end plates 18, and which reach as far as the sealing plates 29, ensure that no dirt which may have reached the bearing main body 1 via the central bores 17 reaches the balls or the contact zone with the rail 2. Thus a substantially hermetic sealing of the rolling-contact area is made possible.

Figure 5:
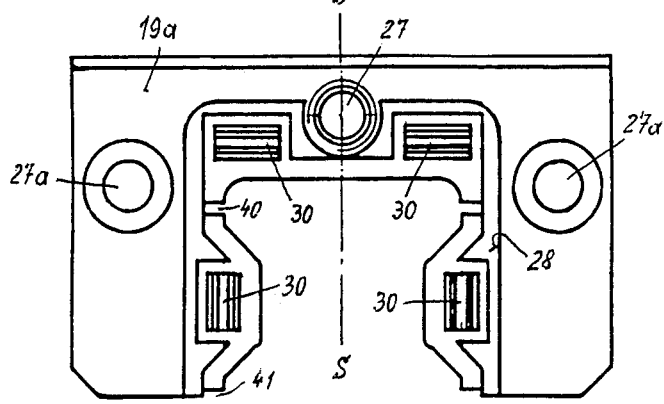
FIG. 5 shows a view of the end plates, seen from outside.

The recess 28 for receiving the sealing plate 29 is clearly shown in FIG. 5, and the position of the snap elements 30 and 39 is clearly shown in FIGS. 5, 7, 12 and 13.

FIG. 6 shows a retaining web 20b, as illustrated in FIG. 3, on a larger scale. For guiding the load-transmitting ball rows A1 and B1, two retaining grooves A14 and B14, adapted to the ball diameter, are integrally formed on the retaining web 20b. The retaining web 20b is secured over its entire length against bending by a spring 32b which extends into a corresponding groove 32a (FIG. 2e) in the bearing main body 1. In addition, the retaining webs 20a and 20b of the two cage halves are connected to one another by pins 33a inserted into a bore 33b.

FIG. 7 shows the construction of a C-shaped section 30 of the snap connection 39 with which the sealing plate 29 is fixed to the end plate 18. Two resilient tongues 34 curved in an arch shape, together with a cavity 35, form a C-section. A correspondingly formed bulbous section 39 (FIG. 13) on the sealing plate 29 is adapted to be snapped into the C-section by the resilient tongues 34 being deflected aside.

The section VIII—VIII indicated in FIG. 3 is shown in FIG. 8. The symmetrical lubricant supply channel 26 (see FIG. 3), which is U-shaped, has a semi-cylindrical cross-section.

The semi-cylindrical deflection piece 36 shown in FIGS. 9, 9a, 10, 10a and 11, on its flat rear side 36b, has a longitudinal distribution channel 26a as a continuation of the lubricant supply channel 26 which has the same cross-section. Two transverse bores 37 in the deflection piece 36 connect the longitudinal distribution channel 26a to the curved ball rows A3, B3 . . . The transverse bores 37 communicate with the inner deflection surfaces 36a which are integrally formed on the deflection pieces 36. The inner deflection surfaces 36a is provided for the inner guidance of the curved ball rows A3, B3 . . . and ensures a smooth ball movement.

It can be recognised in FIG. 9 that the centres of the transverse bores 37 of the inner deflection piece 36, which is shown in FIGS. 10, 10a and 11, are not located at the same spacing as the centres of the two recesses 22 but are closer together. This is because the location of the transverse bores 37 must not disturb the ball cycle in the area of the inner deflection surface 36a. To achieve the same effect, they could of course be placed appropriately far apart from one another.

FIGS. 12 and 13 show the outer and inner contours of the sealing plate 29 and in the shape of its sealing lip 29a. The sealing plate 29 is fixed via the snap connections which fix the sealing plate 29 to the plastics cage halves 18, 20a and 20b. The sealing plate 29 is made of relatively soft plastics or rubber material.

FIG. 14 shows one way of using a bearing according to the present invention. For special installation cases, it can be advantageous to divide the bearing main body 1 to enable, for example, a wider rail 2 to be assembled. As a result of the position of the ball circulation channels and the cage design resulting therefrom having only one group of aligned retaining webs 20a and 20b for two load-transmitting ball rows, it is possible to divide the bearing main body 1 and the cage 2 at relatively low expense along the plane S—S of symmetry. At the same time, the seal is maintained. Only the lubricant supply has to be modified, so that the two parts 40a and 40b of the bearing main body 1, which parts arise from the division of the latter, can be lubricated individually. If the rail 2 is also divided, namely into two profiled parts 42a and 42b and possibly an intermediate piece 42c, the range of the bearing application is increased still further. In principle, longitudinal guides of any width can therefore be achieved, the intermediate piece 42c being dimensioned accordingly.

With further reference to FIG. 5 it should be added that the lubricant connection 27 is mounted in the end plate 18 on the front surface 19a thereof. If means are added for raising the lubricant pressure so as to force lubricant into the lubricant supply channel 26, then the force with which the lubricant is pressed against the end plate 18 balances the force which is built up by the pressure of the lubricant in the lubricant supply channel 26. In this way, the end plate 18, which consists of plastics material, is prevented from lifting away from the adjacent end surface 1d of the bearing main body 1. In this way also, the lubricant is prevented from escaping between the end face 1d and the front surface 19 of the end plate 18 and thereby prematurely giving the impression that all parts of the bearing to be lubricated have already been sufficiently lubricated.

FIGS. 15 to 22 show an embodiment of the present invention in which the balls are replaced by rollers. Analogous parts have the same reference numerals as in FIGS. 1 to 14 but increased by 100.

FIG. 15 shows an end plate 118 whose contact surface 119 faces the bearing main body (not shown). The end plate 118 contains a lubricant supply channel 126. Two pairs of roller bearings are shown on each side of the rail (not marked), it being sufficient to describe the left hand half of FIG. 15, in which it is possible to see roller circulation channels or circuits A, B. The roller circulation circuits A,B, are arranged in intersecting planes 145, 146. The planes 145, 146 intersect along a line of intersection E, which is parallel to the longitudinal axis of the rail (not marked) and the bearing main body. The load-transmitting roller rows are indicated as A1 and B1, the roller rows running in the reverse direction being indicated as B2 and A2. The load-transmitting roller rows A1, B1 are adapted to rest against load-absorbing tracks B12, A12 of the rail. The roller rows A2, B2 running in the reverse direction are guided in return channels A21, B21 of square cross section. As may be seen from FIGS. 17 and 18, the apices of the curved roller rows B3, A3 are staggered in the axial direction of the rail and intersect each other. The curved roller row B3 further from the bearing main body is designated the outer curved roller row, and the curved roller row A3 nearer the bearing main body is designated the inner curved roller row. The outer curved roller row B3 comprises an outer deflection surface 147 which is formed by an indentation or countersunk portion 148 in the end plate 118. The curved roller row B3 also comprises an inner deflection surface 149 which is formed partially, i.e. at 149a from an outer deflection piece 150 and partially, i.e. at 149b, from an inner deflection piece 151. The inner curved roller row A3 comprises an outer deflection surface 152 which is formed partially, i.e. at 152a, from the outer deflection piece 150 and partially, i.e. at 152b, from the indentation 148. The inner curved roller row A3 also comprises an inner deflection surface 163, which is formed from the inner deflection piece 151.

The deflection pieces 150, 151 are arranged to abut each other in the countersunk portion 148. The arrangement is such that the section 149a of the inner deflection surface 149 of the outer curved roller row B3 is connected to sections 149b of the deflection surface 149 of the outer curved roller row B3. The arrangement is also such that the section 152a of the outer deflection surface 152 of the inner curved roller row is connected to sections 152b of the outer deflection surface 152 of the inner curved roller row A3.

The inner deflection piece 151 comprises a rear face 151b (FIG. 18) which is positioned flush with the contact surface 119 of the end plate 118. A longitudinal distributing channel 126a is formed in the rear face 151b of the inner deflection piece 151, the distribution channel 126a being joined to the lubricant supply channel 126 and connected via a transverse bore 137 to the inner curved roller row A3.

Retaining webs 120b and 120a (FIG. 15) are formed on the end plate 118 and hold the load-transmitting roller rows A1 and B1 in engagement with the tracks (not shown) of the bearing main body.

It should be assumed that the end plates 118 at the two ends of the bearing main body are identical to each other, such that only one mould is used to produce the end plates. This means, as will be seen from FIGS. 15, 17 and 18, that the curved roller row A3, belonging to the roller circulation channel or circuit A, of the opposite end plate (not shown) is an outer curved roller row and that the curved roller row B3, belonging to the opposite end plate, of the roller circuit circulation channel or B is an inner curved roller row. In this way the roller circulation channels or circuits A and B are the same length and the end plates are the same shape. In this way also it is ensured that each roller circulating channel or circuit A, B can be lubricated as shown in FIGS. 17 and 18.

In FIG. 22 it is further indicated how the load-carrying roller rows A1, B1 can be secured against falling out of the bearing by projections 154 on the end plate or bearing main body. Corresponding projections can also be attached to the retaining webs 120a, 120b. Since the retaining webs 120a, 120b can consist of relatively soft resilient material, as can the end plates 118 also, it is possible without further modifications to press the rollers past the projections 154 into their working position inside the load-carrying roller rows A1, B1. The rollers are preferably fixed in the plane separating the two retaining webs 120a, the two cage halves 118 being separated from each other during assembly by the diameter of the rollers. The possibility of this kind of assembly also exists for the other embodiments, even those with balls.

All other design features, especially with regard to the sealing plate and sealing strips, can be constructed precisely as in the embodiment according to FIGS. 1 to 14.

The construction of the linear bearing with rollers has the advantage that even greater loads can be carried. The rollers can be constructed as cylindrical rollers, as shown in FIGS. 15 to 21. However, they can also be constructed as barrels, i.e. as cambered rollers, or even with a substantially smaller diameter, in which case they are called needles.

The embodiment of FIGS. 15 to 21 has the advantage that the two roller circulation channels or circuits A, B, as seen in FIG. 15, can be accommodated in relatively little space. In this case the disadvantage has to be accepted that the two roller circulation channels or circuits need to be staggered in the longitudinal direction of the rail. However, this disadvantage entails only a relatively slight extension of the bearing. The load-carrying capacity of the bearing in relation to torque is also maintained practically without change.

FIGS. 23 to 27 show a further embodiment with rollers. Analogous parts are given the same reference numerals as in the embodiment of FIGS. 1 to 14, but each increased by 200.

In the embodiment of FIG. 23, corresponding roller circulation channels or circuits A, B are arranged with the load-carrying roller rows A1, B1 respectively and the roller rows A2, B2 respectively, which run in the reverse direction, being disposed in parallel planes F, G. The planes F, G could also be inclined at an acute angle to each other, so that they intersect at a position beyond the roller circulation channels or circuits A, B.

The load-carrying roller rows A1, B1 roll over the tracks A12, B12 respectively of the rail, which is otherwise not shown. The roller rows A2 and B2 running in the reverse direction are guided in return channels A21 and B21 of the bearing main body, which channels are not shown per se in FIG. 23 and extend upwards at right angles to the plane of the drawing. A countersunk portion 248 (FIG. 24) is formed in the end plate 218 and forms an outer deflection surface 255. The outer deflection surface 255 is assembled from two outer partial deflection surfaces 255a and 255b. Both partial deflection surfaces 255a and 255b are conical around an axis H. The rollers of curved roller row A3 roll with their circumferential surfaces against the partial deflection surface 255a. One of the end faces of the rollers of the curved roller row A3 slides against the partial deflection surface 255b. In the countersunk portion 248 there is sunk a deflection piece 256 comprising an inner deflection surface 257 (FIG. 25). The inner deflection surface 257 is assembled from two partial deflection surfaces 257a and 257b. The partial deflection surface 257a aids the rolling of the circumferential surfaces of the rollers of curved roller row A3, while the other end faces of the rollers adjoin the partial deflection surface 257b. The partial deflection surfaces 257a and 257b are also conical surfaces around the axis H.

A rear surface 258 of the deflection piece 256 lies flush with the contact surface 219 of the end plate 218. In this rear surface 258 there is formed a longitudinal distribution channel 226a which is connected to the lubricant supply channel in the end plate 218. A transverse bore 237 (FIG. 24) leads from the longitudinal distribution channel 226a to the inner deflection surface 257.

The inner deflection surfaces for the curved roller rows A3 and B3 of the two roller circulation channels or circuits A, B are formed on the deflection piece 256.

The embodiment of FIGS. 23 to 27 has, as does the embodiment of FIGS. 15 to 21, the advantage that the two circulation channels or circuits A, B, as seen in FIGS. 23, can be accommodated in a small space. It is not necessary for the curved roller rows to intersect. The longitudinal extension of the two circulation channels or circuits A, B inside the bearing main body and the end plates is identical. The problems resulting from the arrangement of the curved roller rows A3, B3 with roller axes inclined towards each other can be simply solved by the design of the deflection surfaces, especially if the end plates and the deflection surfaces consist of plastics material favourable to sliding.

Figure 28:
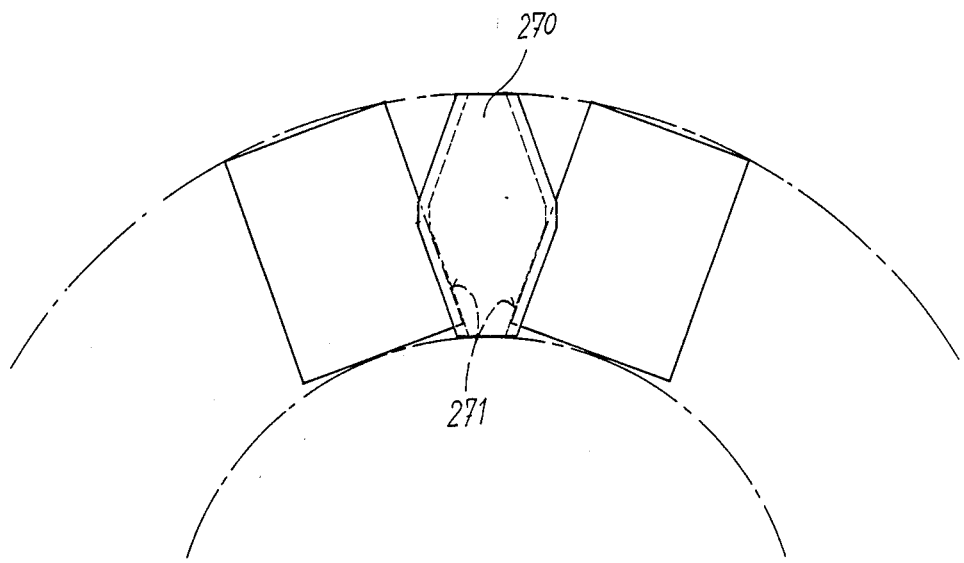
FIG. 28 is a view of a spacer between two successive rollers in the region of a curved rolling member row of a further embodiment of a bearing according to the present invention.
Figure 29:
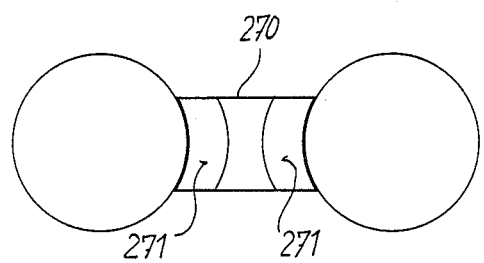
FIG. 29 is a plan view of a spacer according to FIG. 28 between two successive rollers which are axially parallel to each other, i.e. located in the area of a load-transmitting rolling member row or a row of rolling members running in the reverse direction.

As is shown in FIGS. 28 and 29, spacers 270 can be provided between successive rollers, which spacers, when viewed in a plane determined by the axes of two successive rollers (FIG. 28) are double-trapezoidal in form and, as the enlarged plan view of FIG. 29 shows, have grooves 271 in their circumferential surfaces to receive successive rollers. The movement of the rollers in the curved roller rows is substantially improved by these spacers.

The load-carrying roller rows A1, B1 can be secured in the same way as in FIG. 22 by the projections 154.

In the embodiment of FIGS. 28 and 29 also the retaining webs 220a and 220b (not shown in FIGS. 28 and 29) can also be formed on the end plates 218. The two end plates 218 can be identical in shape.

It remains to be noted that in all the embodiments described above the retaining webs can also be separate from the end plates, so that four parts may be needed for the construction of each cage, i.e. two end plates and two retaining webs, the retaining webs engaging with both ends in the end plates and being held there preferably unrotatably.

I claim:

1. An anti-friction bearing comprising a rail; a bearing main body which is mounted on and adapted to be moved axially along the rail; at least one pair of bearing member circuits which are formed in the bearing main body and in the rail, each bearing member circuit of the pair having a rectilinear, load-transmitting bearing member row in engagement with an axially parallel, load-absorbing track of the bearing main body and with an axially parallel, load-absorbing track of the rail, a bearing member row running in the reverse direction and two curved bearing member rows therebetween; end plates having deflection surfaces for the curved bearing member rows and the end plates being made integral with axially parallel retaining webs corresponding in length to one-half of the axial length of said bearing main body which webs are located in alignment with one another and abut each other at their ends, the retaining webs securing the load-transmitting bearing member rows in engagement with the load-absorbing tracks of the bearing main body; the two load-transmitting bearing member rows of the two bearing member circuits of the pair being secured in engagement with the respective track of the bearing main body by a single group of two retaining webs which are in alignment with one another and which are common to the load-transmitting bearing member rows of said pair of bearing member circuits, each of said single group of two retaining webs being provided on a portion of a respective end plate and being arranged between the load-transmitting bearing member rows of said pair of bearing member circuits, each of said single group of two retaining webs being provided with two retaining tracks (A14, B14), said retaining tracks (A14, B14) transitioning continuously without interruption of web material into respective deflection surfaces (22) of the respective end plate (18).

2. An anti-friction bearing comprising a rail; a bearing main body which is mounted on and adapted to be moved axially along the rail; at least one pair of bearing member circuits which are formed in the bearing main body and in the rail, each bearing member circuit of the pair having a rectilinear, load-transmitting bearing member row in engagement with an axially parallel, load-absorbing track of the bearing main body and with an axially parallel, load-absorbing track of the rail, a bearing member row running in the reverse direction and two curved bearing member rows therebetween; end plates having deflection surfaces for the curved bearing member rows and the end plates being made integral with axially parallel retaining webs corresponding in length to one-half of the axial length of said bearing main body which webs are located in alignment with one another and abut each other at their ends, the retaining webs securing the load-transmitting bearing member rows in engagement with the load-absorbing tracks of the bearing main body; the two load-transmitting bearing member rows of the two bearing member circuits of the pair being secured in engagement with the respective track of the bearing main body by a single group of two retaining webs which are in alignment with one another and which are common to the load-transmitting bearing member rows of said pair of bearing member circuits, each of said single group of two retaining webs being provided on a portion of a respective end plate and being arranged between the load-transmitting bearing member rows, of said pair of bearing member circuits, each of said single group of two retaining webs being provided with two retaining tracks (A14, B14), said retaining tracks (A14, B14) transitioning continuously without interruption of web material into respective deflection surfaces (22) of the respective end plate (18), and the retaining webs are supported in the bearing main body by a tongue-groove connection.

3. An anti-friction bearing comprising a rail; a bearing main body which is mounted on and adapted to be moved axially along the rail; at least one pair of bearing member circuits which are formed in the bearing main body and in the rail, each bearing member circuit of the pair having a rectilinear, load-transmitting bearing member row in engagement with an axially parallel, load-absorbing track of the bearing main body and with an axially parallel, load-absorbing track of the rail, a bearing member row running in the reverse direction and two curved bearing member rows therebetween; end plates having deflection surfaces for the curved bearing member rows and the end plates being made integral with axially parallel retaining webs corresponding in length to one-half of the axial length of said bearing main body which webs are located in alignment with one another and abut each other at their ends, the retaining webs securing the load-transmitting bearing member rows in engagement with the load-absorbing tracks of the bearing main body; the two load-transmitting bearing member rows of the two bearing member circuits of the pair being secured in engagement with the respective track of the bearing main body by a single group of two retaining webs which are in alignment with one another and which are common to the load-transmitting bearing member rows of said pair of bearing member circuits, each of said single group of two retaining webs being provided on a portion of a respective end plate and being arranged between the load-transmitting bearing member rows, of said pair of bearing member circuits, each of said single group of two retaining webs being provided with two retaining tracks (A14, B14), said retaining tracks (A14, B14) transitioning continuously without interruption of web material into respective deflection surfaces (22) of the respective end plate (18), a curved bearing member row is guided by an outer deflection surface provided in a contact surface of the end plate and by an inner deflection surface, the inner deflection surface being formed on at least one deflection piece which is located in a deflection piece holder recess in the contact surface of the end plate, and a lubricant supply channel is provided in the contact surface of at least one said end plate.

4. An anti-friction bearing comprising a rail; a bearing main body which is mounted on and adapted to be moved axially along the rail; at least one pair of bearing member circuits which are formed in the bearing main body and in the rail, each bearing member circuit of the pair having a rectilinear, load-transmitting bearing member row in engagement with an axially parallel, load-absorbing track of the bearing main body and with an axially parallel, load-absorbing track of the rail, a bearing member row running in the reverse direction and two curved bearing member rows therebetween; end plates having deflection surfaces for the curved bearing member rows and the end plates being made integral with axially parallel retaining webs corresponding in length to one-half of the axial length of said bearing main body which webs are located in alignment with one another and abut each other at their ends, the retaining webs securing the load-transmitting bearing member rows in engagement with the load-absorbing tracks of the bearing main body; the two load-transmitting bearing member rows of the two bearing member circuits of the pair being secured in engagement with the respective track of the bearing main body by a single group of two retaining webs which are in alignment with one another and which are common to the load-transmitting bearing member rows of said pair of bearing member circuits, each of said single group of two retaining webs being provided on a portion of a respective end plate and being arranged between the load-transmitting bearing member rows, of said pair of bearing member circuits, each of said single group of two retaining webs being provided with two retaining tracks (A14, B14), said retaining tracks (A14, B14) transitioning continuously without interruption of web material into respective deflection surfaces (22) of the respective end plate (18), the bearing main body comprises two pairs of bearing member circuits which are disposed opposite one another and locate the rail between them, and the oppositely located pairs of bearing member circuits are accommodated in parts of the bearing main body and their mutual spacing is variable.

5. An anti-friction bearing comprising a rail; a bearing main body which is mounted on and adapted to be moved axially along the rail; at least one pair of bearing member circuits which are formed in the bearing main body and in the rail, each bearing member circuit of the pair having a rectilinear, load-transmitting bearing member row in engagement with an axially parallel, load-absorbing track of the bearing main body and with an axially parallel, load-absorbing track of the rail, a bearing member row running in the reverse direction and two curved bearing member rows therebetween; end plates having deflection surfaces for the curved bearing member rows and the end plates being made integral with axially parallel retaining webs corresponding in length to one-half of the axial length of said bearing main body which webs are located in alignment with one another and abut each other at their ends, the retaining webs securing the load-transmitting bearing member rows in engagement with the load-absorbing tracks of the bearing main body; the two load-transmitting bearing member rows of the two bearing member circuits of the pair being secured in engagement with the respective track of the bearing main body by a single group of two retaining webs which are in alignment with one another and which are common to the load-transmitting bearing member rows of said pair of bearing member circuits, each of said single group of two retaining webs being provided on a portion of a respective end plate and being arranged between the load-transmitting bearing member rows, of said pair of bearing member circuits, each of said single group of two retaining webs being provided with two retaining tracks (A14, B14), said retaining tracks (A14, B14) transitioning continuously without interruption of web material into respective deflection surfaces (22) of the respective end plate (18), the bearing main body comprises two pairs of bearing member circuits which are disposed opposite one another and locate the rail between them, and the rail is made of two profiled parts having load absorbing tracks, there being at least one intermediate piece therebetween.

6. An anti-friction bearing comprising a rail; a bearing main body which is mounted on and adapted to be moved axially along the rail; at least one pair of bearing member circuits which are formed in the bearing main body and in the rail, each bearing member circuit of the pair having a rectilinear, load-transmitting bearing member row in engagement with an axially parallel, load-absorbing track of the bearing main body and with an axially parallel, load-absorbing track of the rail, a bearing member row running in the reverse direction and two curved bearing member rows therebetween; end plates having deflection surfaces for the curved bearing member rows and the end plates being made integral with axially parallel retaining webs corresponding in length to one-half of the axial length of said bearing main body which webs are located in alignment with one another and abut each other at their ends, the retaining webs securing the load-transmitting bearing member rows in engagement with the load-absorbing tracks of the bearing main body; the two load-transmitting bearing member rows of the two bearing member circuits of the pair being secured in engagement with the respective track of the bearing main body by a single group of two retaining webs which are in alignment with one another and which are common to the load-transmitting bearing member rows of said pair of bearing member circuits, each of said single group of two retaining webs being provided on a portion of a respective end plate and being arranged between the load-transmitting bearing member rows, of said pair of bearing member circuits, each of said single group of two retaining webs being provided with two retaining tracks (A14, B14), said retaining tracks (A14, B14) transitioning continuously without interruption of web material into respective deflection surfaces (22) of the respective end plate (18), the bearing main body comprises two pairs of bearing member circuits which are disposed opposite one another and locate the rail between them, and sealing plates are attached to the end plates on their front faces facing away from the bearing main body, each sealing plate having a sealing edge which at least approximately follows the profile of the rail at least on a portion of its periphery.

7. An anti-friction bearing comprising a rail; a bearing main body which is mounted on and adapted to be moved axially along the rail; at least one pair of bearing member circuits which are formed in the bearing main body and in the rail, each bearing member circuit of the pair having a rectilinear, load-transmitting bearing member row in engagement with an axially parallel, load-absorbing track of the bearing main body and with an axially parallel, load-absorbing track of the rail, a bearing member row running in the reverse direction and two curved bearing member rows therebetween; end plates having deflection surfaces for the curved bearing member rows and the end plates being made integral with axially parallel retaining webs corresponding in length to one-half of the axial length of said bearing main body which webs are located in alignment with one another and abut each other at their ends, the retaining webs securing the load-transmitting bearing member rows in engagement with the load-absorbing tracks of the bearing main body; the two load-transmitting bearing member rows of the two bearing member circuits of the pair being secured in engagement with the respective track of the bearing main body by a single group of two retaining webs which are in alignment with one another and which are common to the load-transmitting bearing member rows of said pair of bearing member circuits, each of said single group of two retaining webs being provided on a portion of a respective end plate and being arranged between the load-transmitting bearing member rows, of said pair of bearing member circuits, each of said single group of two retaining webs being provided with two retaining tracks (A14, B14), said retaining tracks (A14, B14) transitioning continuously without interruption of web material into respective deflection surfaces (22) of the respective end plate (18), and sealing strips, which are parallel to the load-transmitting bearing member rows, are attached to the bearing main body, on both sides of the load-transmitting bearing member rows of a pair of bearing member circuits, the sealing strips engaging the rail.

8. An anti-friction bearing comprising a rail; a bearing main body which is mounted on and adapted to be moved axially along the rail; at least one pair of bearing member circuits which are formed in the bearing main body and in the rail, each bearing member circuit of the pair having a rectilinear, load-transmitting bearing member row in engagement with an axially parallel, load-absorbing track of the bearing main body and with an axially parallel, load-absorbing track of the rail, a bearing member row running in the reverse direction and two curved bearing member rows therebetween; end plates having deflection surfaces for the curved bearing member rows and the end plates being made integral with axially parallel retaining webs corresponding in length to one-half of the axial length of said bearing main body which webs are located in alignment with one another and abut each other at their ends, the retaining webs securing the load-transmitting bearing member rows in engagement with the load-absorbing tracks of the bearing main body; the two load-transmitting bearing member rows of the two bearing member circuits of the pair being secured in engagement with the respective track of the bearing main body by a single group of two retaining webs which are in alignment with one another and which are common to the load-transmitting bearing member rows of said pair of bearing member circuits, each of said single group of two retaining webs being provided on a portion of a respective end plate and being arranged between the load-transmitting bearing member rows, of said pair of bearing member circuits, each of said single group of two retaining webs being provided with two retaining tracks (A14, B14), said retaining tracks (A14, B14) transitioning continuously without interruption of web material into respective deflection surfaces (22) of the respective end plate (18), the bearing main body comprises two pairs of bearing member circuits which are disposed opposite one another and locate the rail between them, the bearing main body is U-shaped and is disposed about the rail, the bearing member circuits being accommodated in the legs of the U-shaped bearing main body, and the web of the U-shaped bearing main body has a contact surface, remote from the rail, for contact with a machine part, the web being provided with means for connecting it to the machine part by bolted connections which are arranged close to the legs of the U-shaped bearing main body and approximately centrally between the said legs.

9. An anti-friction bearing comprising an axially extending rail having a pair of opposite sides; a bearing main body which is mounted on and straddles said rail and is adapted to move axially along the rail; two pair of bearing member circuits which are formed in the bearing main body and in the rail, each pair located on an opposite side of said rail, each bearing member circuit of the pair having a rectilinear, load-transmitting bearing member row in engagement with an axially parallel, load-absorbing track of the bearing main body and with an axially parallel, load-absorbing track of the rail, a bearing member row running in the reverse direction and two curved bearing member rows therebetween; a pair of end plates having deflection surfaces for the curved bearing member rows and each said end plate including a pair of axially parallel laterally spaced retaining webs formed integrally therewith projecting from said end plate and having an end spaced from said end plate, said webs on said end plate located in alignment and abutment with said webs on said other end plate, said end plates and retaining webs secured to said bearing main body, the retaining webs securing the load-transmitting bearing member rows in engagement with the load-absorbing tracks of the bearing main body; the two load-transmitting bearing member rows of the each pair of bearing member circuits being secured in engagement with the respective track of the bearing main body by a single group of two retaining webs each projecting from a different said end plate and disposed in alignment with one another and which are common to the load-transmitting bearing member rows, each single group of two retaining webs being arranged between the load-transmitting bearing member rows on one of said opposite sides of said rail.

10. Anti-friction bearing as claimed in claim 1, 2, 3, 4, 5, 6, 7 or 8, wherein the retaining webs have retaining tracks for the load-transmitting bearing member rows.

11. Anti-friction bearing as claimed in claim 1, 2, 3, 4, 5, 6, 7 or 8, wherein the ends of the retaining webs which face towards and are in alignment with one another are connected to one another by push-in connections.

12. Anti-friction bearing as claimed in claim 1, 2, 4, 5, 6, 7 or 8, wherein a curved bearing member row is guided by an outer deflection surface provided in a contact surface of the end plate and by an inner deflection surface, the inner deflection surface being formed on at least one deflection piece which is located in a deflection piece holder recess in the contact surface of the end plate.

13. Anti-friction bearing as claimed in claim 1, 2, 3, 4, 5, 6, 7 and 8 wherein each curved bearing member row is substantially semi-circular over at least part of its length.

14. Anti-friction bearing as claimed in claims 1, 2, 3, 4, 5, 7 or 8, wherein sealing plates are attached to the end plates on their front faces facing away from the bearing main body, each sealing plate having a sealing edge which at least approximately follows the profile of the rail at least on a portion of its periphery.

15. Anti-friction bearing as claimed in claim 5, wherein a lubricant supply channel is connected to a lubricant inlet of the end plate, leads to the deflection piece holder recess and supplies at least one bearing member circulation channel with lubricant by a lubricant distribution system inside the deflection piece holder recess.

16. Anti-friction bearing as claimed in claim 15, in which the lubricant inlet is fixed to an end face of the end plate parallel to the contact surface of the end plate in such a way that a lubricant device, which is positioned adjacent the lubricant inlet, exerts pressure on the end plate perpendicular to the contact surface.

17. Anti-friction bearing as claimed in claim 15, wherein the lubricant distribution system comprises a longitudinal distribution channel in a rear surface of the deflection piece, the rear surface facing away from the inner deflection surface, and there is a transverse bore which connects the longitudinal distribution channel with the inner deflection surface of the respective curved bearing member row.

18. Anti-friction bearing as claimed in claim 17, in which the opening of the transverse bore into the inner deflection surface occurs at a secondary site for the guidance of the bearing members.

19. Anti-friction bearing as claimed in claim 1, 2, 3, 7 or 8 wherein the bearing main body comprises two pairs of bearing member circuits which are disposed opposite one another and locate the rail between them.

20. Anti-friction bearing as claimed in claim 19, 4, 5 or 6 wherein the bearing main body is U-shaped and is disposed about the rail, the bearing member circuits being accommodated in the legs of the U-shaped bearing main body.

21. Anti-friction bearing as claimed in claim 20, wherein the bearing member circuits are arranged in the said legs parallel to the web of the bearing main body.

22. Anti-friction bearing as claimed in claim 19, 4, 5 or 6 wherein the oppositely located pairs of bearing member circuits are accommodated in parts of the bearing main body and their mutual spacing is variable.

23. Anti-friction bearing as claimed in claim 19, 4, 5 or 6 wherein the rail is made up of two profiled parts having load-absorbing tracks, there being at least one intermediate piece therebetween.

24. Anti-friction bearing as claimed in claim 14 wherein the sealing plates are located in recesses of the said front faces and are substantially flush with the latter.

25. Anti-friction bearing as claimed in claim 14, wherein the sealing plates are fixed on the end plates by snap connections.

26. Anti-friction bearing as claimed in claim 25 wherein the snap connections are formed by interlocking C-shaped and bulbous sections.

27. Anti-friction bearing as claimed in claim 1, wherein sealing strips, which are parallel to the load-transmitting bearing member rows, are attached to the bearing main body, on both sides of the load-transmitting bearing member rows of a pair of bearing member circuits, the sealing strips engaging the rail.

28. Anti-friction bearing as claimed in claim 20, wherein the web of the U-shaped bearing main body has a contact surface, remote from the rail, for contact with a machine part, the web being provided with means for connecting it to the machine part by bolted connections which are arranged close to the legs of the U-shaped bearing main body and approximately centrally between the said legs.

29. Anti-friction bearing as claimed in claim 1, in which, when viewed in a section perpendicular to the axis of the rail, the load-absorbing tracks of the rail diverge towards the bearing main body.

30. Anti-friction bearing as claimed in claim 1, 2, 3, 4, 5, 6, 7 or 8, in which bearing member circuits are ball circuits, the rectilinear, load-transmitting bearing member rows are ball rows, the bearing member rows running in the reverse direction are ball rows running in the reverse direction, the curved bearing member rows are curved ball rows, and the load absorbing tracks of the bearing main body, the load absorbing tracks of the rail and retaining tracks of the retaining webs are constructed respectively as running grooves and retaining grooves.

31. Anti-friction bearing as claimed in claim 30, in which the load-transmitting ball rows of the pair of ball circuits, on one side of a plane containing the axes of the two load-transmitting ball rows of the pair, engage the running grooves of the bearing main body, the load-transmitting ball rows, on the other side of this plane, engaging the retaining webs by means of peripheral areas which face toward one another, and engaging the running grooves of the rail by means of peripheral areas which face away from one another.

32. Anti-friction bearing as claimed in claim 31 in which adjacently located curved ball rows of the ball circuits of the pair are provided with a common, semi-cylindrical deflection piece which is received by a common, semi-cylindrical deflection piece receiving channel.

33. Anti-friction bearing as claimed in claim 30, in which the outer deflection surface and the inner deflection surface form a deflection channel of approximately constant cross section.

34. Anti-friction bearing as claimed in claim 1 in which the bearing member circuits are roller circuits, the load-transmitting bearing member rows are load-transmitting roller rows, bearing member rows running in the reverse direction are roller rows running in the reverse direction and the curved bearing member rows are curved roller rows.

35. Anti-friction bearing as claimed in claim 34 in which paired roller circuits are arranged in intersecting planes, the line of intersection of these planes lying parallel to the axis of the rail, mutually adjacent curved roller rows of paired roller circuits being spaced intersectingly in the axial direction of the rail, and the rollers of the load-carrying roller rows, the rollers of the roller rows running in the reverse direction and the rollers of the curved roller rows are axially parallel to each other in each of the roller circuits.

36. Anti-friction bearing as claimed in claim 35 in which deflection surfaces of the intersecting curved roller rows are formed on the respective end plate and on outer an inner deflection pieces mounted in this end plate which are respectively disposed further from and nearer the bearing main body.

37. Anti-friction bearing as claimed in claim 36, in which of the two intersecting curved roller rows, the outer curved roller row, i.e. the one further from the bearing main body, has an outer deflection surface which is constructed on a countersunk portion of the end plate and an inner deflection surface which is formed by the outer deflection piece and the inner deflection piece, the inner curved roller row, i.e. the one nearer the bearing main body, having an outer deflection surface, which is formed partly by the outer deflection piece and partly by the countersunk portion in the end plate, and an inner deflection surface which is formed by the inner deflection piece.

38. Anti-friction bearing as claimed in claim 37, in which the inner deflection piece has a longitudinal distribution channel for lubricant on its rear surface facing the bearing main body, the said distribution channel being joined to the lubricant supply channel and being connected to the inner deflection surface of the inner curved roller row by a transverse bore which passes through the inner deflection piece.

39. Anti-friction bearing as claimed in claim 35, in which the paired roller circuits are approximately the same length in the axial direction of the rail, one of the roller circuits forming the inner curved roller row in the region of one of the end plates and the outer curved roller row in the region of the other end plate.

40. Anti-friction bearing as claimed in claim 29, in which the two end plates with the deflection pieces are substantially identical in shape.

41. Anti-friction bearing as claimed in claim 34, in which two paired roller circuits are arranged in planes intersecting at an acute angle beyond the roller circuits the line of intersection being parallel to the axial direction of the rail.

42. Anti-friction bearing as claimed in claim 34 in which, in each roller circuit, the rollers of the load-transmitting roller row on the one hand and the rollers of the roller row running in the reverse direction on the other hand are arranged with their roller axes in common planes inclined towards each other, the rollers of the curved roller rows being arranged with their axes on a conical surface.

43. Anti-friction bearing as claimed in claim 34, in which a curved roller row comprises an outer deflection surface, i.e. one further from the bearing main body, which is formed by a countersunk portion in the respective end plate and consists of two outer partial deflection surfaces, namely a first outer, conical, partial deflection surface, which is adjacent the circumferential surfaces of the rollers, and a second outer, conical, partial deflection surface, which is adjacent one of the end faces of the rollers of the curved roller row.

44. Anti-friction bearing as claimed in claim 43 in which each curved roller row also comprises an inner deflection surface, i.e, one nearer the bearing main body, which is formed on a deflection piece mounted in the respective end plate and consists of two inner partial deflection surfaces, namely a first inner, conical, partial deflection surface, which is adjacent the circumferential surfaces of the rollers of a curved roller row, and a second inner, conical, partial deflection surface, which is adjacent the other end faces of the rollers of a curved roller row.

45. Anti-friction bearing as claimed in claim 44 in which the deflection piece has a rear face flush with the contact surface of the respective end plate.

46. Anti-friction bearing as claimed in claim 45 in which a longitudinal distribution channel is formed in the said rear face, the distribution channel being joined to a lubricant supply channel and connected to the inner deflection surface by a transverse bore passing through the deflection piece.

47. Anti-friction bearing as claimed in claim 43, in which the two paired roller circuits are provided with a common deflection piece.

48. Anti-friction bearing as claimed in claim 34, in which the rollers are constructed as cylindrical rollers.

49. Anti-friction bearing as claimed in claim 34, in which the rollers are constructed as barrel-type rollers.

50. Anti-friction bearing as claimed in claim 34, in which the rollers are constructed as cylindrical needles.

51. Anti-friction bearing as claimed in claim 34, in which the roller circuits are formed of successive loose rollers, i.e. the rollers are not connected together.

52. Anti-friction bearing as claimed in claim 34, in which loose spacers are arranged between successive rollers.

53. Anti-friction bearing as claimed in claim 52, in which the spacers, in a view perpendicular to the plane determined by the axes of two successive rollers, have an approximately double-trapezoidal outline and are constructed with grooves in their side faces facing the rollers, the said grooves receiving the rollers, the spacers corresponding approximately to the roller length in their extension parallel to the roller axes.

54. Anti-friction bearing as claimed in claim 34, said curved and roller rows being guided by deflection channels of substantially constant cross section.

55. An anti-friction bearing comprising a rail; a bearing main body which is mounted on and adapted to be moved axially along the rail; at least one pair of bearing member circuits which are formed in the bearing main body and in the rail, each bearing member circuit of the pair having a rectilinear, load-transmitting bearing member row in engagement with an axially parallel, load-absorbing track of the bearing main body and with an axially parallel, load-absorbing track of the rail, a bearing member row running in the reverse direction and two curved bearing member rows therebetween; end plates having deflection surfaces for the curved bearing member rows and the end plates being made integral with axially parallel retaining webs corresponding in length to one-half of the axial length of said bearing main body which webs are located in alignment with one another and abut each other at their ends, the retaining webs securing the load-transmitting bearing member rows in engagement with the load-absorbing tracks of the bearing main body; the two load-transmitting bearing member rows of the two bearing member circuits of the pair being secured in engagement with the respective track of the bearing main body by a single group of two retaining webs which are in alignment with one another and which are common to the load-transmitting bearing member rows of said pair of bearing member circuits, each of said single group of two retaining webs being provided on a portion of a respective end plate and being arranged between the load-transmitting bearing member rows, of said pair of bearing member circuits, each of said single group of two retaining webs being provided with two retaining tracks (A14, B14), said retaining tracks (A14, B14) transitioning continuously without interruption of web material into respective deflection surfaces (22) of the respective end plate (18), a curved bearing member row is guided by an outer deflection surface provided in a contact surface of the end plate and by an inner deflection surface, the inner deflection surface being formed on at least one deflection piece which is located in a deflection piece holder recess in the contact surface of the end plate, a lubricant supply channel is provided in the contact surface of at least one end plate, the lubricant supply channel is connected to a lubricant inlet of the end plate, leads to the deflection piece holder and supplies at least one bearing member circulation channel with lubricant by a lubricant distribution system inside the deflection piece holder, the lubricant distribution system comprises a longitudinal distribution channel in a rear surface of the deflection piece, the rear surface facing away from the inner deflection surface, and there is a transverse bore which connects the longitudinal distribution channel with the inner deflection surface of the respective curved bearing member row, the bearing member circuits are ball circuits, the rectilinear, load-transmitting bearing member rows are ball rows, the bearing member rows running in the reverse direction are ball rows running in the reverse direction, the curved bearing member rows are curved ball rows, and the load absorbing tracks of the bearing main body, the load absorbing tracks of the rail and retaining tracks of the retaining webs are constructed respectively as running grooves and retaining grooves, and the opening of the transverse bore into the inner deflection surface is staggered in relation to a plane containing the ball centres of the respective curved ball row.

* * * * *